United States Patent
Wanner et al.

(10) Patent No.: US 8,633,613 B2
(45) Date of Patent: Jan. 21, 2014

(54) POWER CONVERTER (75) Inventors: Jan Wanner, Bonaire (NL); Menno Kardolus, De Bilt (NL); Jos H. Schijffelen, Breda (NL)

(73) Assignee: Power Research Electronics B.V., Oosterhout (NL)

( * ) Notice: Subject to any disclaimer, the term of this patent is extended or adjusted under 35 U.S.C. 154(b) by 511 days.

(21) Appl. No.: 12/988,993

(22) PCT Filed: Apr. 25, 2008

(86) PCT No.: PCT/EP2008/003388
§ 371 (c)(1),
(2), (4) Date: Dec. 17, 2010

(87) PCT Pub. No.: WO2009/129830
PCT Pub. Date: Oct. 29, 2009

(65) Prior Publication Data
US 2011/0260535 A1  Oct. 27, 2011

(51) Int. Cl.
*H02J 3/14* (2006.01)
(52) U.S. Cl.
USPC .......................................................... 307/31
(58) Field of Classification Search
USPC ........................................................... 307/31
See application file for complete search history.

(56) References Cited

U.S. PATENT DOCUMENTS

| 5,617,015 | A | * | 4/1997 | Goder et al. | ................... 323/282 |
| 5,619,404 | A | | 4/1997 | Zak | |
| 5,663,874 | A | | 9/1997 | Mader et al. | |
| 6,369,525 | B1 | | 4/2002 | Chang et al. | |
| 6,504,267 | B1 | * | 1/2003 | Giannopoulos | ................. 307/31 |
| 6,636,003 | B2 | | 10/2003 | Rahm et al. | |
| 2006/0072252 | A1 | | 4/2006 | Sluijs | |
| 2007/0194627 | A1 | | 8/2007 | Mori et al. | |
| 2007/0262760 | A1 | | 11/2007 | Liu | |

FOREIGN PATENT DOCUMENTS

| JP | 2006-304419 A | 11/2006 |
| WO | 02076150 A1 | 9/2002 |
| WO | 03041254 A2 | 5/2003 |
| WO | 2008029325 A1 | 3/2008 |
| WO | 2008063454 A2 | 5/2008 |

* cited by examiner

*Primary Examiner* — Robert L. DeBeradinis
(74) *Attorney, Agent, or Firm* — Richard M. Goldberg

(57) ABSTRACT

A power converter includes a DC input (26) connected to an inductive element (TR), a switch (T1) arranged to interrupt the inductive current cyclically with a predetermined cycle period, a plurality of load circuits (31, 32, 33), and a multiplexer (36) having a plurality of parallel channels (M1, M2, M3) between first and second output terminals (34, 38) of the inductive element (TR), wherein each channel includes one of the load circuits (31, 32, 33), and the multiplexer is adapted to make the channels conductive sequentially and periodically, and the multiplexer has a switching period that is a multiple of the predetermined cycle period of the switch (T1).

15 Claims, 7 Drawing Sheets

POWER CONVERTER

BACKGROUND OF THE INVENTION

The invention relates to a power converter comprising a DC input connected to an inductive element, a switch arranged to interrupt the inductive current cyclically with a predetermined cycle period, a plurality of load circuits, and a multiplexer having a plurality of parallel channels between first and second output terminals of the inductive element, wherein each channel includes one of the load circuits, and the multiplexer is adapted to make the channels conductive sequentially and periodically.

More particularly, the invention relates to a power converter that can be used as an LED driver, especially for high luminance LEDs for illumination purposes.

LED illumination devices, e.g. devices that may be connected to the power grid by being screwed into a socket like a conventional light bulb, may be equipped with white LEDs or with combinations of colored LEDs, e.g. in the basic colors red, green and blue (RGB). Combinations of colored LEDs are superior to white LEDs in terms of life time and have the additional advantage that, by individually controlling the intensity of the different colors, the color temperature of the light source may be adapted as desired, and drifts in color temperature that may be due to aging or different temperature characteristics of the LEDs can easily be compensated. However, a drawback of colored LEDs is that separate current-controlled power supplies must be provided for the different colors.

It is possible of course to provide an individual power converter for each color, i.e. for each group of LEDs that have the same color and may be connected in series or in parallel. This solution, however, is relatively expensive, because at least three power converters are needed for the at least three colors that are necessary for obtaining white light.

Another approach is to provide a transformer with a plurality of secondary windings, so that each load circuit (group of LEDs) may be connected to a different one of the secondary windings. In this case, however, the extra windings lead to an unfavorable transformer (size, cost, efficiency), and the necessity to provide post-regulators further reduces the efficiency and increases the costs. Yet another alternative is to connect the load circuits in series in the secondary circuit of the transformer. In this case, however, The LEDs must be selected in accordance with a very strict classification (binning) in terms of efficiency, color, and/or forward voltage, or additional circuitry is required in each load circuit for individually controlling each of the output powers, which adds to the complexity and costs of the converter as a whole and makes it more difficult to galvanically isolate the output circuits from the potentially harmful grid voltage.

US 2006-072252 A1 and WO 03/041254 disclose power converters of the type indicated in the opening paragraph, wherein the multiplexer subdivides each energy packet that is delivered by the switched inductive element into a number of fractions to be directed to different outputs.

SUMMARY OF THE INVENTION

It is an object of the invention to provide a power converter that has a relatively low complexity, can be produced at low costs and nevertheless permits an individual power control of a plurality of load circuits.

In order to achieve this object, a power converter according to the invention is characterized in that the multiplexer has a switching period that is a multiple of the predetermined cycle period of the switch.

Since the multiplexer permits the inductor current to flow through only one of the load circuits at a time, the average power delivered to an individual output circuit will depend on the number of cycle periods that the multiplexer connects this output circuit to the inductive element within each period of the multiplexer. This number corresponds to the number of energy packets per time unit that are delivered to the pertinent output circuit. The average power delivered to an individual output circuit will also depend upon the energy content of the energy packets, and this energy content is in turn determined by the "on"-time of the switch in the respective cycle. As a consequence, it is possible to finely control the output power delivered to each individual load circuit with a simple and low-cost circuitry, wherein the inductive element and the switch are shared among the various load circuits. Since the inductive element is a custom-designed, hand-made element, this component is expensive, especially when it also has to provide safety isolation between the grid and the outputs. It is therefore a great advantage in terms of costs and efficiency that only a single inductive element needs to be used. The switch has to operate at line voltage level. Switching relatively high peak high currents at a high frequency (in order to keep the dimensions of the inductive element small) is also expensive. Moreover, the switch must be controlled through drive electronics. The invention, which permits to use only a (primary) switch thus achieves an appreciable cost reduction. Moreover, the fact that the multiplexer does not subdivide the individual energy packets but only routes the entire packets to different output circuits permits a high control accuracy and a reduction of switching losses.

One of the consequences of multiplexing is that the output power is delivered to the various load circuits more discontinuously, i.e. in the form of pulses with a periodicity corresponding to the multiplex period. The corresponding output voltages will be pulsed or periodic DC voltages that may however be smoothened depending on the presence of parallel capacitances in the respective load circuits. Moreover, when the power converter is used as an LED driver, the multiplex period may be selected so high that substantially no flicker would be visible to the human eye even when the ripples of the output voltages were not smoothened-out.

More specific optional features of the invention are indicated in the dependent claims. These features relate to a simple power supply for the control circuitry of the power converter itself, the further reduction of flicker and an improvement of power quality on the side of the grid.

BRIEF DESCRIPTION OF THE DRAWINGS

Preferred embodiments of the invention will now be explained in conjunction with the drawings, wherein.

DETAILED DESCRIPTION

Figure 1:
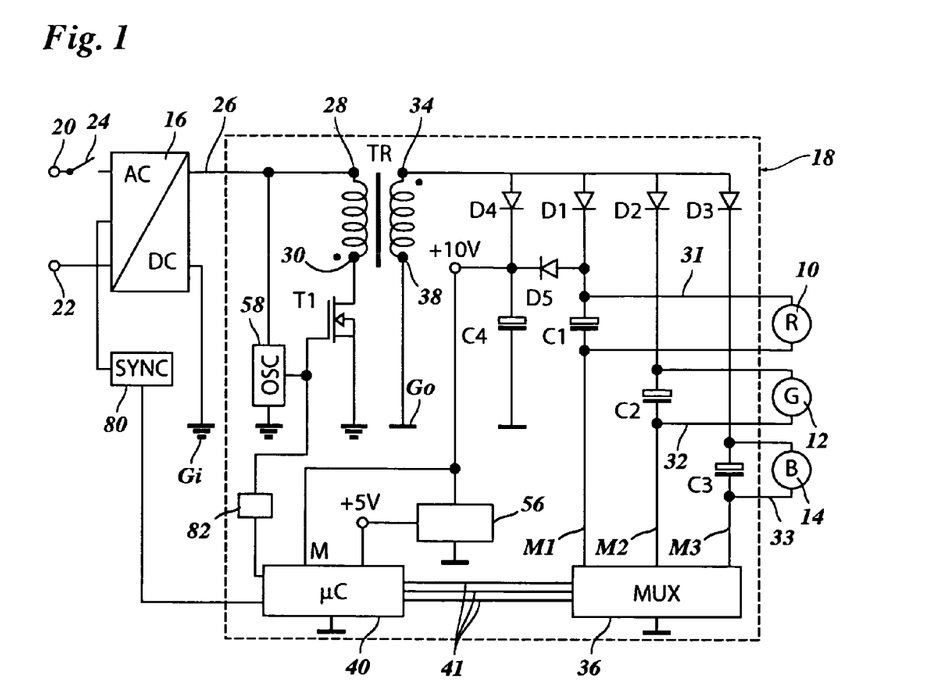
FIG. 1 is a simplified circuit diagram of a power converter according to a first embodiment of the invention.

FIG. 1 illustrates an LED driver serving as a power supply for three LEDs 10, 12, 14 in the colors red (R), green (G) and blue (B). While only a single LED per color has been shown in the drawing, each of these single LEDs may be replaced by a network comprising a series and/or parallel connection of several LEDs of the same color.

The LED driver comprises an AC/DC converter 16 and a DC/DC power converter 18. The AC/DC converter 16 has an input side connected to terminals 20, 22 of a 230 V/50 Hz power grid, for example, via a manually operated switch 24, and it further comprises an output side connected to a DC input 26 of the DC/DC converter 18.

The DC input 26 of the DC/DC converter 18 is connected to a first primary terminal 28 of an inductive element, in this case a transformer TR, and a second primary terminal 30 of that transformer is grounded via a switch T1, which, when closed, closes the primary circuit of the transformer. The switch T1 may for example be an N-channel MOS-FET.

The DC/DC converter 18 has three individually controlled power outputs formed by load circuits 31, 32 and 33 each of which serves as a power supply with a voltage of 9 V, for example, for one of the LEDs 10, 12, 14. The load circuits 31, 32, 33 are connected in parallel to a first secondary terminal 34 of the transformer TR, via respective diodes D1, D2 and D3, and are further connected to a multiplexer 36 which selectively connects one of the load circuits to ground and, therewith, to a grounded second secondary terminal 38 of the transformer TR. Thus each load circuit is included in one of three parallel channels M1, M2, M3 of the multiplexer 36.

The switch T1 and the multiplexer 36, via control lines 41, are controlled by a control circuit which, in this case, is formed by a microcontroller 40.

In the present example, it shall be assumed that the DC input 26 receives from the AC/DC converter 16 an essentially constant voltage $U_p$ (of approximately 310 V). Under the control of the microcontroller 40, the switch T1 opens and closes the primary circuit of the transformer TR with a frequency of e.g. 25 kHz (corresponding to a cycle period P of 40 μs) and with a controllable duty cycle D, as has been shown in FIG. 2. Whenever the switch T1 is closed, the primary current $I_p$ of the transformer starts to increase from zero at a rate that is proportional to the input voltage $U_p$. When the switch T1 is opened again, an amount of energy corresponding to the time integral of $(U_p \cdot I_p)$ over the duty cycle (pulse width) has been stored in the magnetic field of the transformer. This time integral can easily be calculated in an ordinary microcontroller.

Figure 2:
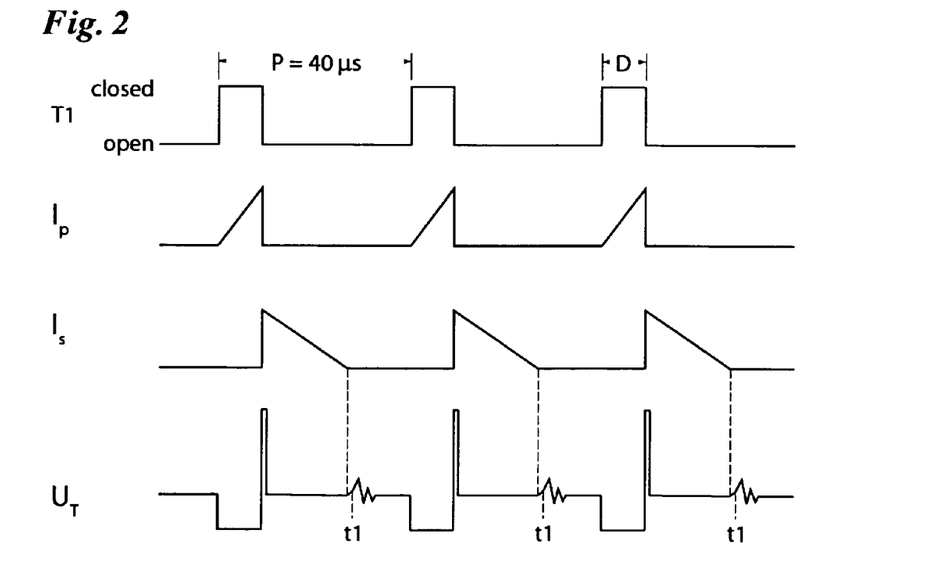
FIG. 2 is a time chart illustrating wave forms of various signals occurring in the circuit shown in FIG. 1.

While the magnetic field is being built up, the diodes D1-D3 and another diode D4 (to be described later) prevent a current from flowing in the secondary circuit of the transformer. However, as soon as the switch T1 is opened again and one of the load circuits, e.g. the load circuit 31, is grounded via the multiplexer 36, the magnetic field of the transformer will decay, and a current $I_s$ starts to flow through the diode D1, the load circuit 31 and the multiplexer 36.

The load circuit 31 further includes a capacitor C1 connected in parallel to the load, i.e. to the LED 10. Consequently, the current flowing trough the load circuit 31 will first be used for loading the capacitor C1, and the current through the LED 10 will increase in proportion to the increase of the voltage drop across the capacitor C1. In this way, provided that the corresponding channel of the multiplexer 36 remains conductive, the entire energy packet that had been stored in the transformer during the "closed" pulse of the switch T1 will be conferred to the load circuit 31, and the part of the energy packet that is not consumed by the LED 10 will be stored in the capacitor C1. This process will be repeated for every cycle of the switch T1, and the voltage drop across the capacitor C1, which determines the current flowing through the LED 10, will reach an equilibrium that is determined by the pulse width of the switch T1.

The process described above will also apply to each of the load circuits 32, 33, which include respective capacitors C2 and C3. In the period in which the multiplex channel of, e.g. the load circuit 31 is open, i.e. the load circuit is disconnected from the terminal 38, the capacitor C1 will be discharged via the LED 10, and it will be reloaded again as soon as the multiplex channel is closed again. Thus, provided that the capacitance of the capacitor C1 is sufficiently large, the LED 10 will be supplied with an essentially constant voltage in spite of the cyclic operation of the multiplexer 36. The average current flowing through the LED and, consequently, the light intensity of the LED 10 will be determined by the pulse width of the switch T1 and by the duration of the channel-closed period of the multiplexer which can both be controlled with the microcontroller 40. Of course, the same applies to the load circuits 32, 33 and the LEDs 12, 14.

In most practical applications, the (average) output voltages and currents supplied to the LEDs 10, 12 and 14 will have to be different from one another in order to obtain the correct mixture of colors, i.e. the desired color temperature of the light source. A first way of controlling the output powers for the three LEDs 10, 12, 14 separately from one another will now be described by reference to FIG. 3.

Figure 3:
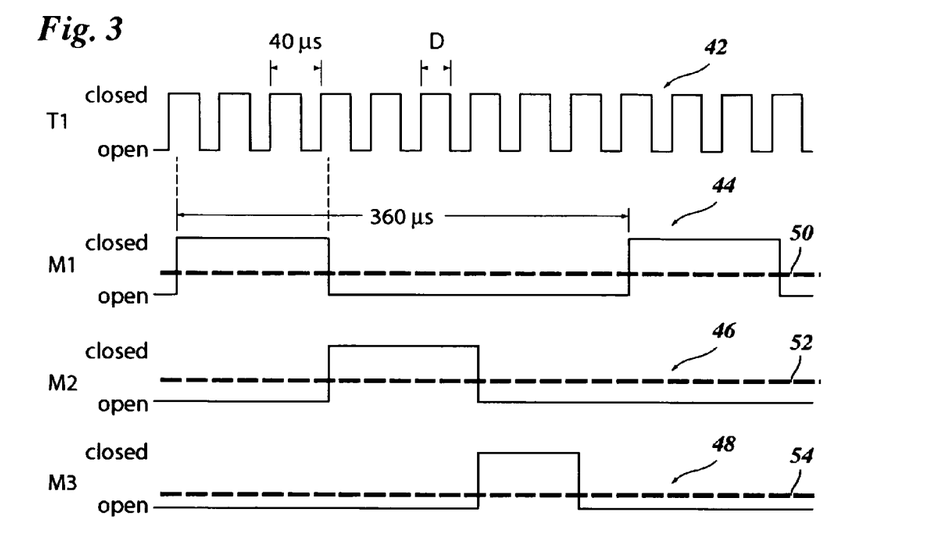
FIGS. 3 and 4 are time charts illustrating different multiplex schemes.

A first wave form 42 shown in FIG. 3 is that of the signal that is output by the microcontroller 40 and controls the switch T1. The other three wave forms 44, 46 and 48 in FIG. 2 show the sequence of "open" and "closed" states of the three channels M1, M2 and M3 of the multiplexer 36.

For illustration purposes, each of these wave forms 44-48 is shown to have a period of 360 μs, corresponding to 9 cycles of the wave form 42 and one complete switching period of the multiplexer. The first channel M1 that is associated with the load circuit 31 and the LED 10 is closed (conductive) for the first three periods of the wave form 42 and open for the remaining six periods. The channel M2 is closed for the subsequent (fourth to sixth) three switch periods, i.e. its "closed" period is equal in duration to that of the channel of M1. Consequently, the load circuits 31 and 32 receive the same average energy, and the red and green LEDs 10 and 12 will in this example be driven with an identical power (and hence an identical average current, provided that the LEDs have the same forward voltage), as is indicated by constant curves 50, 52 in FIG. 2. In contrast, the third channel M3 of the multiplexer is closed only for two periods (the seventh and the eighth) in the 360 μs interval, and consequently the average current applied to the blue LED 14 will be only two thirds of that applied to the LEDs 10 and 12. This average current is indicated by the constant curve 54 in FIG. 3.

Thus, in this example, each period of the multiplexer will include the sequence: "RRRGGGBB0", wherein R, G, and B stand for energy packets delivered to the red, green and blue LED, respectively, and "0" stands for a packet that is not delivered at all.

Figure 4:
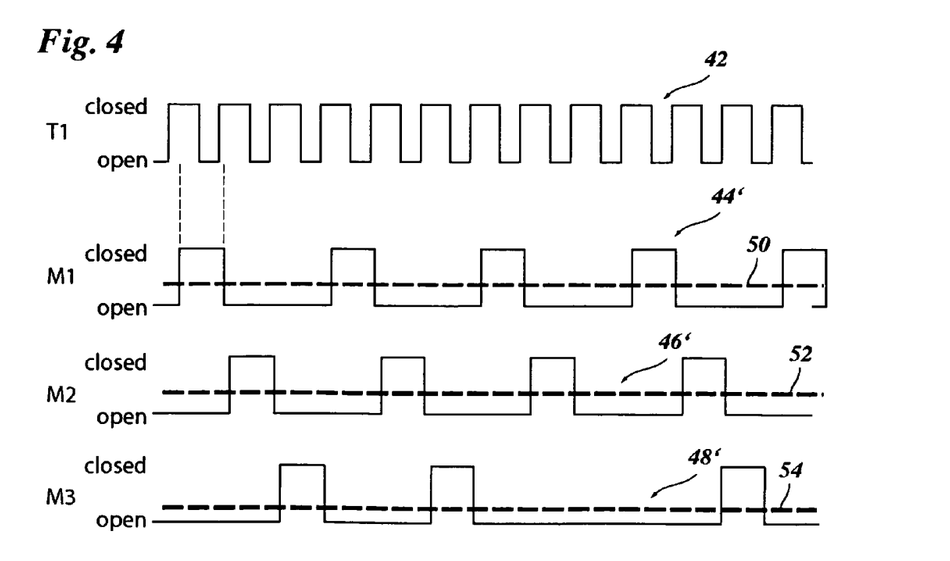

As another example. FIG. 4 shows modified wave forms 44'-48' for the channels M1-M3, which wave forms would achieve the same relative intensities of the LEDs as in FIG. 3. The difference is that, in FIG. 4, each period of the multiplexer will include the sequence: "RGBRGBRG0". This pattern, in which the energy packages are spread equally over the multiplex period, will produce a much smaller and more high-frequent (thus cheaper to filter) ripple in the outputs.

As is illustrated by these simplified examples, the brightness of the red, green and blue LEDs 10, 12, 14 can be controlled individually by determining the number of pulses of the switch T1 for which the corresponding channels M1, M2, M3 of the multiplexer 36 are closed. In general, the period of the multiplexer is n times the cycle period of the switch T1 (n being an integer). In a practical embodiment, the period of the multiplexer 36 will be considerably larger than 360 μs (9 pulses) and may for example be 40 ms, corresponding to 1000 pulses of the switch T1. Then, of course, the power distribution among the three outputs can be varied in very fine steps, i.e. quasi-continuously. Yet, the multiplex period of 40 ms corresponds to a repeat frequency of 25 Hz, which is still high enough to prevent any flicker of the LEDs to become visible to the human eye, even when the output voltages (voltage drops at the capacitors C1-C3) are not exactly constant.

It will be noticed that the repeat cycle of the multiplexer 36 may include some pulses where none of the three channels M1-M3 is closed. In the example shown in FIG. 3, this is the case for the ninth and last pulse of the 360 μs period. During— or rather subsequent to—this cycle, the secondary current of the transformer TR flows through the diode D4 and loads a capacitor C4 connected in series therewith. Thus, by providing a sufficient number of pulses where all multiplex channels are open, the capacitor C4, whose capacity will be small in comparison to that of the capacitors C1-C3, may be kept in a loaded state, in spite of a load circuit 56 being connected in parallel thereto.

The microcontroller 40 has a monitor input M connected to the plus side of the capacitor C4, and is programmed to control the number of pulses where all of the channels of the multiplexer are open to be large enough to hold the voltage at a point between the diode D4 and the capacitor C4 at least 10 V. The load circuit 56 is in this case a known voltage divider circuit, which may include a Zener diode or the like and is used to convert the voltage of 10 V into a stabilized voltage of 5 V serving as power supply for the microcontroller 40. Thus, the power converter according to the invention provides not only three separately controllable DC voltage outputs but provides also a DC power supply for its own control circuitry.

As is further shown in FIG. 1, an oscillation circuit 58 is connected to the DC input 26 and has its output connected, e.g. via a DiAc (not shown), to the gate of the switch of T1. Immediately after the manually operable switch 24 has been closed, the microcontroller 40 lacks power supply and is not operating. Then, the oscillator circuit 58 will provide pulses for controlling the switch T1 (with non-controlled duty cycle). Since the microcontroller does not operate, all channels of the multiplexer 36 are open and the entire output power is used to load the capacitor C4. As soon as the latter has reached the necessary voltage of 10 V, the microcontroller 40 starts to operate and overrules the oscillator 58 so as to control the switch T1 with a defined duty cycle and also to control the multiplexer 36.

As is further shown in FIG. 1, a diode D5 is connected between the cathodes of the diodes D4 and D1. During the normal operation of the power converter, this diode D5 will be blocked, because the voltage of the capacitor C4 (10 V) will be larger than the voltage of any of the capacitors C1, C2 and C3. However, when the manually operated switch 24 is opened and the voltage at the DC input 26 falls off rapidly, the capacitor C4 will discharge via the voltage divider 56, and as soon as its voltage drops below that of the capacitor C1, a current flows through the diode D5 and the further discharge of the capacitor C4 is retarded until the capacitor C1 has also been discharged.

As a result, the microcontroller 40 is still capable of operating for one or two seconds after the switch 24 has been opened. This function may be used, for example, for sending instructions to the microcontroller 40 by shortly opening the switch 24 and than closing it again before the microcontroller stops operating. The microcontroller 40 can be programmed to detect (via input M) this brief cut-off in the power supply and to interpret this as a control signal causing it to switch to a different operating mode, e.g. another dimming mode for the LEDs 10, 12, 14. If the switch 24 remains open for a longer period of time, the microcontroller 40 stops operating, and when a new start-up is performed by means of the oscillator circuit 58, the microcontroller will start again in its default mode.

The monitor input M of the microcontroller can also be used for detecting a condition in which one of the output circuits is open, e.g. due to a missing or defective LED, and to switch off the converter in order to protect the capacitors against damage. When such a condition occurs, the voltage drop at the corresponding capacitor C1, C2 or C3 will increase, because the capacitor can no longer be discharged. As a result, the voltage at the input M will also increase, and when it exceeds +10V by a certain amount, this can be taken as an indication that an output circuit is interrupted.

Another possible mode of operation of the power converter shown in FIG. 1 will now be explained by reference to FIG. 5.

Figure 5:
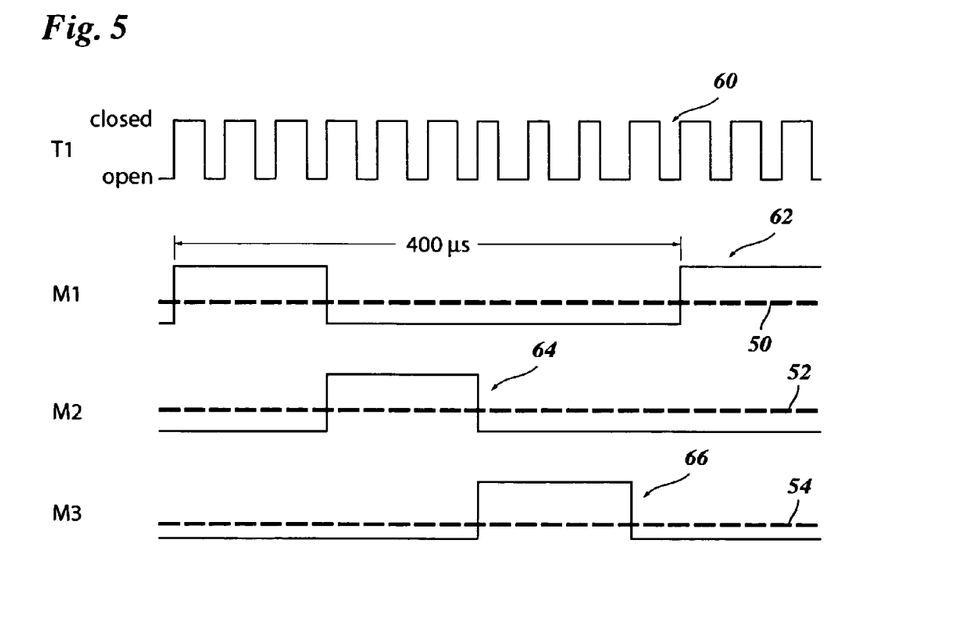
FIG. 5 is a time chart illustrating another possible operation mode of the converter.

A wave form 60 in FIG. 5 indicates the state of the switch T1. The period of the multiplexer 36 is assumed to be 400 μs for illustration purposes, i.e. it covers ten cycles of the wave form 60. As is shown by wave forms 62, 64 and 66, each of the channels M1, M2 and M3 is closed for an interval of the same length, each covering three periods of the switch T1. Thus, in this embodiment, each of the output circuits 31, 32, and 33 receives a like number of energy packets. However, when the channel M3 for the blue LED 14 is closed, the microcontroller 40 operates the switch T1 with a shorter duty cycle, with the result that the energy packets delivered to the output circuit 33 are smaller, and this results in different average output currents for the LEDs 10 and 12 on the one hand and the LED 14 on the other hand.

Of course the concepts illustrated in FIGS. 3, 4 and 5 may be combined with one another in order to finely control the output voltages of the converter.

Figure 6:
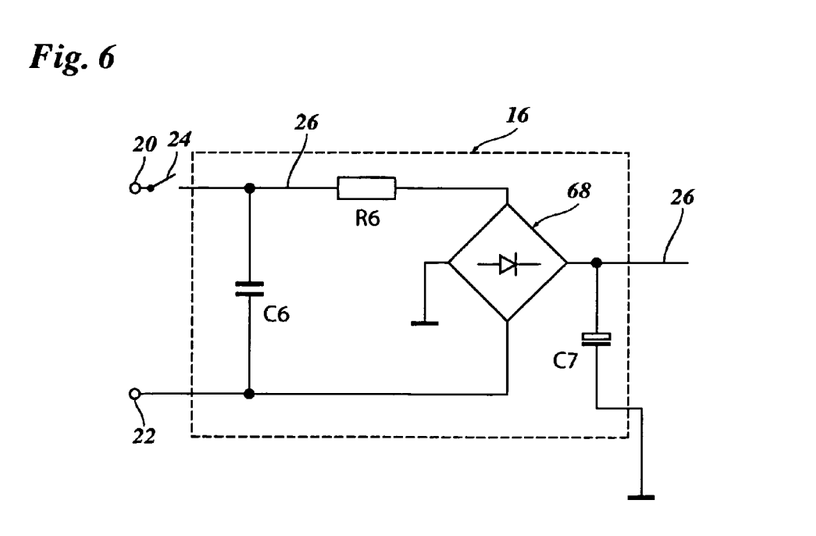
FIG. 6 is a more detailed diagram of an AC/DC converter forming part of the converter shown in FIG. 1.

The capability of the microcontroller 40 to vary the duty cycle of the switch T1 may also be utilized for another purpose. To illustrate this, FIG. 6 shows a circuit diagram of a typical AC/DC converter which may used as the converter 16 in FIG. 1. This converter includes an input capacitor C6, a (fusible) resistor R6, a diode bridge 68 and an output capacitor C7. If the capacitor C7 has a high capacitance, it will largely smoothen the output voltage delivered to the DC input 26, i.e. the capacitor C7 will retain an essentially constant charge level.

Figure 7:
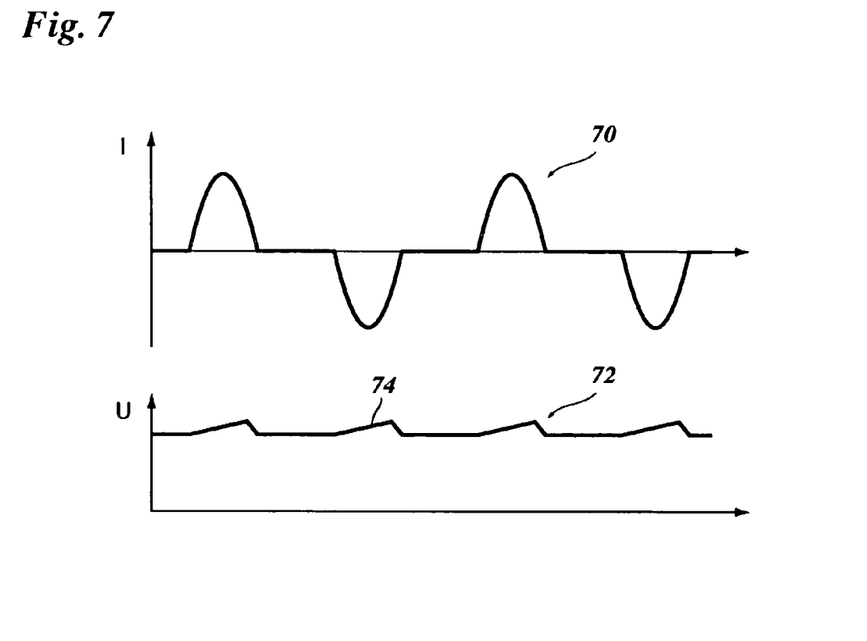
FIGS. 7 and 8 are time charts illustrating wave forms of input voltages and output currents for different configurations of the AC/DC converter shown in FIG. 6.

Thus, in order for a charge current to flow through the diode bridge 68, the voltage drop between either terminal 20 or terminal 22 and the ground level of the device (negative electrode of capacitor C7) must be larger than the essentially constant voltage drop across the capacitor C7. For the input side of the AC/DC converter 16 and hence for the power grid connected to it, this results in a current wave form 70 with the general shape shown by the upper graph in FIG. 7. The lower graph in FIG. 7 shows the corresponding wave form of the voltage U at the DC input 26. It can be seen that the wave form 72 of this voltage U is essentially constant and shows only minor ripples 74. However, the current wave form 70 shown in FIG. 7 is very unfavorable in terms of power quality of the grid, because it makes it difficult for the provider to maintain an essentially sinusoidal wave form of the grid voltage. This is why power companies have established standards which apply to all devices having a power consumption of more than a certain limit and which forbid wave forms of the type shown by the wave form 70. Moreover, when a standard TRIAC-type dimmer would be used for dimming an LED light source that is driven by this power converter, wave forms of this type would involve the risk of destroying the dimmer.

Figure 8:
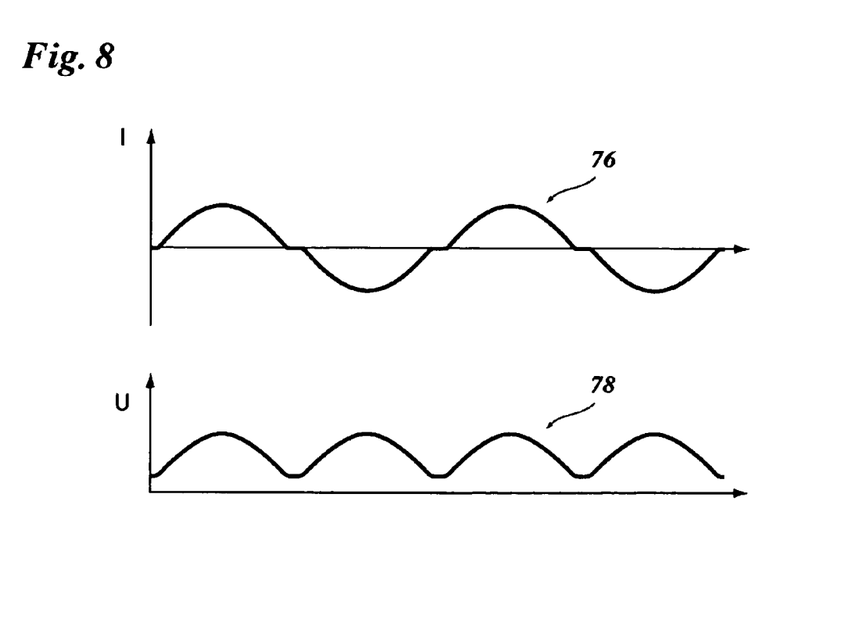

In order to avoid these problems, it is possible in the power converter according to the invention to use a capacitor with a relatively low capacitance as the output capacitor C7. Then, this capacitor will discharge almost completely during each half cycle of the power grid voltage. The resulting current wave form 76 is shown in the top part of FIG. 8. It can be seen that this wave form is more similar to a sine curve and therefore fulfills the pertinent reglementations. On the other hand, however, the corresponding wave form 78 of the output voltage U is far from being constant, as is shown in the lower part of FIG. 8.

When a voltage with the wave form 78 is supplied to the DC input 26 of the AC/DC converter 18, and the switch T1 is operated with a constant duty cycle (as in FIG. 3), then the content of the energy packets supplied to the load circuits 31, 32, 33 would depend upon the momentaneous value of the voltage U, and the average brightness of the corresponding LED could vary long-periodically in accordance with the phase relation between the oscillations of the wave form 78 and the multiplex cycle.

This undesired effect can be avoided by varying the duty cycle of the switch T1 synchronously with the fluctuations of the voltage U (as indicated by the wave form 78).

As is shown in FIG. 1, a synchronizing circuit 80 is provided for synchronizing the microcontroller 40 with the AC/DC converter 16. This is particularly easy, for example, when the multiplex period (40 ms in a practical embodiment) is equal to or an integer multiple of the grid voltage period (20 ms). Then, for each control pulse which the microcontroller 40 delivers to the switch T1, the momentanous value of the voltage U is known, and the accumulation of energy in the transformer can be calculated as a function of time. From this, a variable duty cycle and multiplex pattern (all line synchronized) can be pre-determined such that the transformer receives the same amount of energy in every pulse, irrespective of the momentanous value of the voltage U. In other words, the microcontroller 40 is used for compensating for fluctuations in the voltage applied to the DC input 26.

Similarly, the microcontroller may be used to detect and compensate for fluctuations of the DC voltage that result from fluctuations in the AC voltage at the terminals 20, 22.

The synchronization between the AC/DC converter and the microcontroller 40 is useful also when the voltage applied to the DC input 26 is essentially constant, as in FIG. 7, and shows only the minor ripples 74. Then, the synchronization prevents these ripples 74 from interfering with the periodicity of the multiplexer 36.

In the example shown in FIG. 1, the converter is an isolated power converter in which an input ground Gi on the primary side of the transformer TR is isolated from an output ground Go on the secondary side. In this case, the transformer TR is an isolated transformer, and the synchronizing circuit 80 is a high-ohmic differential synchronizer. Further, the microcontroller 40 controls the switch T1 via an isolated driver 82.

The multiplexer 36 is preferably formed by N-channel MOS-FET switches which can be controlled by the microcontroller 40 via single-ended signals, so that no level-shifting and no differential amplifiers (high-side drivers) are required. In this context, it is also an important feature of the invention that, for each of the output circuits, the diode (e.g. D1), the output circuit (e.g. 31) and the multiplexer 36 are arranged in that order as seen in the direction of the current flow determined by the diode.

Since a parallel-multiplex principle is employed, it is possible to connect parallel capacitances such as the capacitors C1, C2 and C3 in the load circuits 31-33. These parallel capacitances result in an almost pure DC current through the LED despite the discrete energy packages.

In the example illustrated in FIG. 2, the converter is operated in a discontinuous mode, which means that, in each cycle P of the switch T1, the secondary current $I_s$ has time enough to drop to zero before the next pulse occurs. In comparison to a continuous mode, this has the advantage that the secondary current $I_s$ takes the form of distinct pulses or energy packets each of which has a well defined energy content and which are separated by zero-current time intervals. Preferably, as is shown in FIG. 3, for example, the channels of the multiplexer are switched on and off in those intervals in which the switch T1 is closed. As can be seen in FIG. 2, these intervals correspond to intervals in which the secondary current $I_s$ is zero. As a consequence, switching losses can be minimized and the exact switch timings of the multiplexer channels are not critical, as long as they are located in said zero-current interval.

The lowest diagram in FIG. 2 shows the voltage drop $U_T$ across the switch T1, including voltage peaks and oscillations that are caused by stray inductances and capacitances in the circuit.

In particular, a voltage oscillation is produced at the time when the secondary current $I_s$ reaches zero-level again. A very efficient reduction of switching losses is possible by adopting the so-called valley-switching principle, which means that the switch T1 is closed at the very instant in which the voltage oscillation has a minimum, i.e. at the times t1 in FIG. 2 (this principle has however not been used in the example shown in FIG. 2).

On the other hand, if it is necessary to obtain a precisely defined energy content of each output current pulse or energy packet, it is advisable to close the switch T1 at a time when the oscillation of the voltage $U_T$ has practically decayed to zero, so that the rise of the current $I_p$ in the next pulse will not be affected by any voltage fluctuations. This principle, which has been used in the example shown in FIG. 2, is particularly appropriate when the intensity of the LEDs is to be controlled directly, and no feedback-control is provided. The dampening of the oscillations of the voltage $U_T$ may be accelerated by connecting an appropriate dampening circuit, e.g. an R-C-network, in parallel to the switch T1 (active or passive snubbering).

Figure 9:
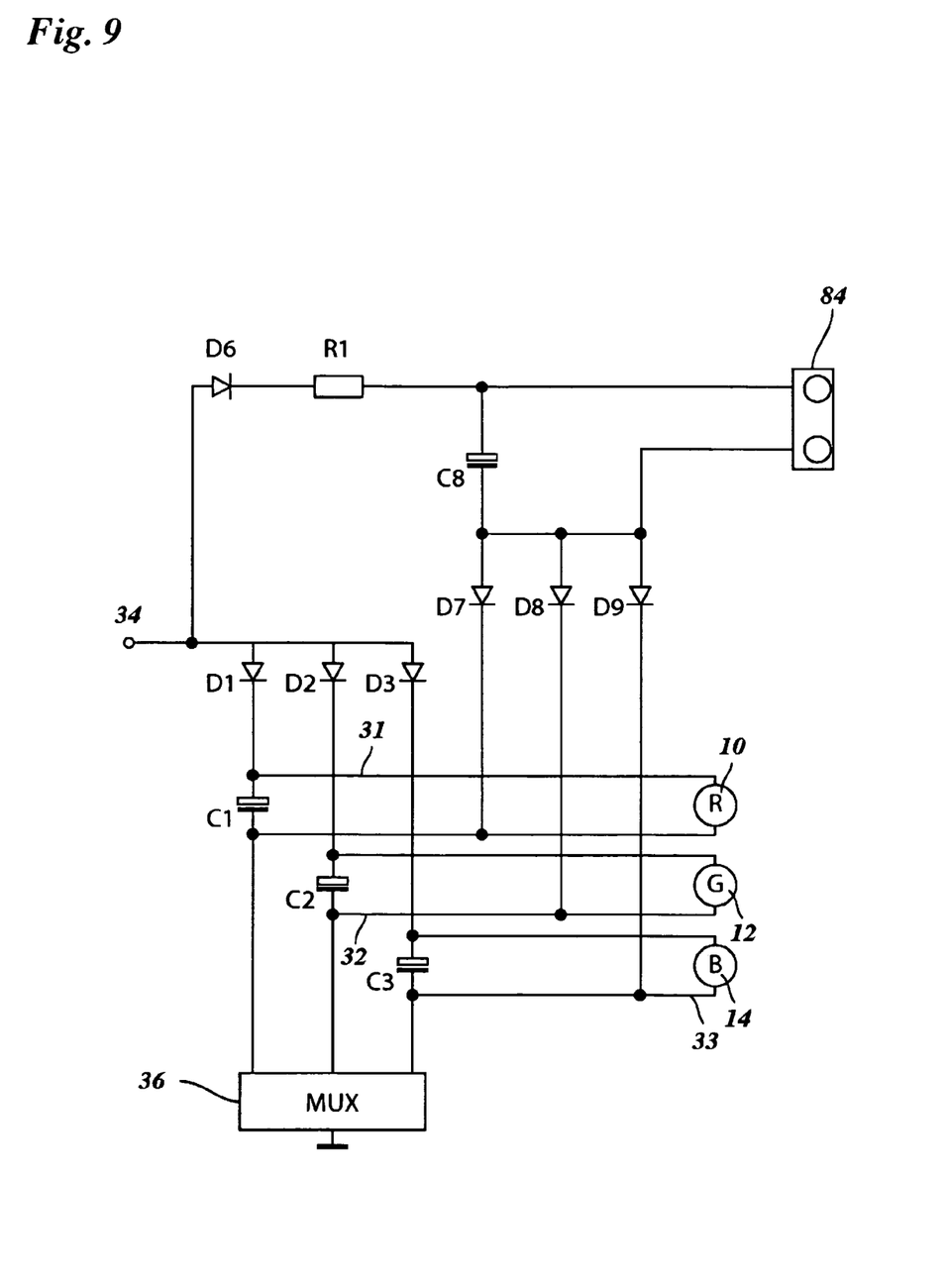
FIG. 9 illustrate a modification of the circuit shown in FIG. 1.

FIG. 9 illustrates a possible supplement to the circuit that has been shown in FIG. 1, for implementing the function of a smart fan drive for a fan 84 that may serve to cool the LEDs 10, 12, 14. The positive power supply terminal of the fan 84 is connected to the first secondary terminal 34 of the transistor via a diode D6 and a resistor R1, in parallel to the diodes D1-D3 and the load circuits 31, 32, 33. The negative terminal of the fan 84 is connected to the negative terminals of each of the LEDs 10, 12, 14 via respective diodes D7, D8 and D9, and a capacitor C8 is connected in parallel to the fan 84.

Thus, in a certain sense, the circuit including the fan 84 forms another load circuit of the converter, with the particular feature that the minus side of this circuit is not connected directly to the multiplexer but to the minus terminals of the LEDs. This has the effect that the voltage drop across the capacitor C8 and, accordingly, the drive power for the fan 84, is proportional to the maximum of the average of the voltage drops across each of the LEDs 10, 12, 14. Consequently, the cooling power of the fan varies in proportion to the heat generated by the LED that is driven with the highest power.

The power converter that has been described above is particularly suited for use as an LED driver and permits individual control of the intensities of the different LED colors. Of course, its use is not limited to three LED colors. The converter might have four or more outputs for controlling LEDs in more than three colors. e.g. RBGA (A=amber), so as to enrich the light spectrum. Individual feedback control of each output may easily implemented so as to automatically compensate for drifts in intensity, color temperature or the like, that may be caused by aging of the LEDs or by environmental influences, in particular the temperature of the LEDs. On the other hand, even when no feedback control is provided, the possibility to precisely adjust the intensities of the LEDs 10, 12, 14 relative to one another permits to significantly reduce the accuracy requirements and hence the costs for "binning" the LEDs.

However, the power converter is not limited to this application but may be used for other purposes, e.g. as a power supply for PCs and other electronic devices. Moreover, the converter need not necessarily be combined with the AC/DC converter 16, as in the shown embodiment, but it might also be a stand-alone DC/DC converter.

Figure 10:
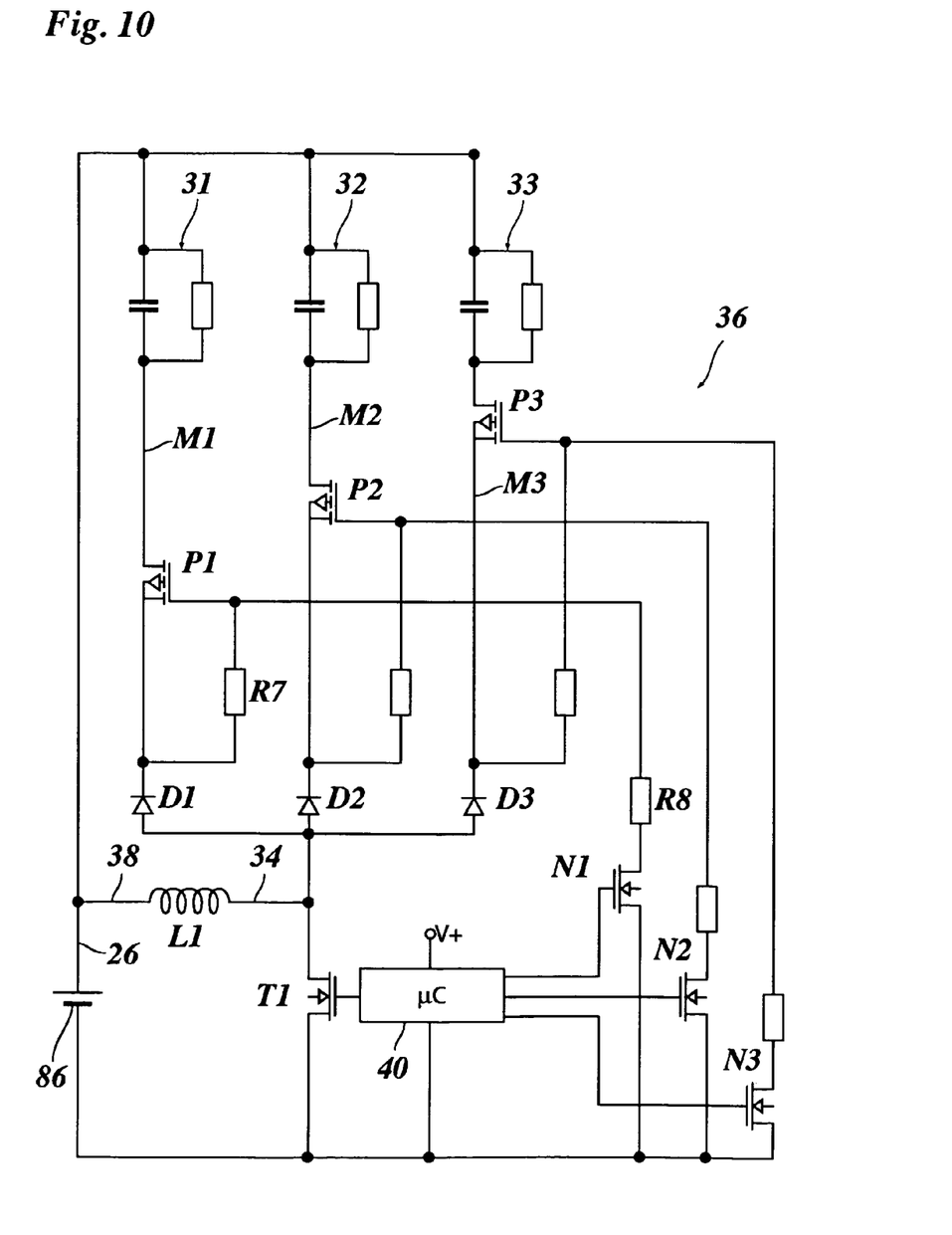
FIGS. 10 and 11 are circuit diagrams illustrating further embodiments of the invention.

It will be noticed that the converter that has been shown in FIG. 1 has the topology of a fly-back converter. Practically all design modifications that are known for fly-back converters are also applicable to the converter according to the invention. Moreover, the invention is not limited to the fly-back topology and may analogously be applied to other converter topologies. FIG. 10 illustrates an example of DC/DC converter wherein all the load circuits have a common minus pole.

Whereas, in the embodiments shown in FIGS. 1 and 9, the average voltages of the minus terminals of the LEDs are "floating" independently of one another, FIG. 10 shows an embodiment of a DC/DC-converter in which the parallel load circuits have a common pole. This has the advantage that the output voltages can easily be measured (and feedback-controlled) without the need of a differential amplifier.

The converter shown in FIG. 10 converts an input voltage of, e.g., 12 Volt into independently controlled output voltages of, e.g., 0-24 Volt across the load circuits 31, 32, 33. The DC input 26 is in this case formed by the plus pole of a battery 86, and all the load circuits, which comprise a load (represented by a resistor) and a parallel capacitance, have one end connected directly to the plus pole of the battery 86. The inductive element is in this case formed by a single inductance (coil) L1 that has its first (input and output) terminal 34 connected to the diodes D1-D3 and, via the switch T1, to the minus pole of the battery 86, whereas the second (input and output) terminal 38 is connected to the plus pole of the battery and hence to the common pole of the load circuits 31-33.

Each channel of the multiplexer 36 comprises a P-channel MOS-FET P1, P2, P3 connected between one of the diodes D1-D3 and one of the load circuits. The gate of each of the P-channel MOS-FETs is controlled by resistors R7, R8 and an N-channel MOS-FET N1, N2, N3 that is directly controlled by the microcontroller 40. Thus, in this case, level shifting is employed for controlling the multiplexer.

The design shown in FIG. 10 utilizes a relatively cheap single inductive element rather than a transformer and permits to control the output voltage below the input voltage. No differential amplifiers are needed.

Figure 11:
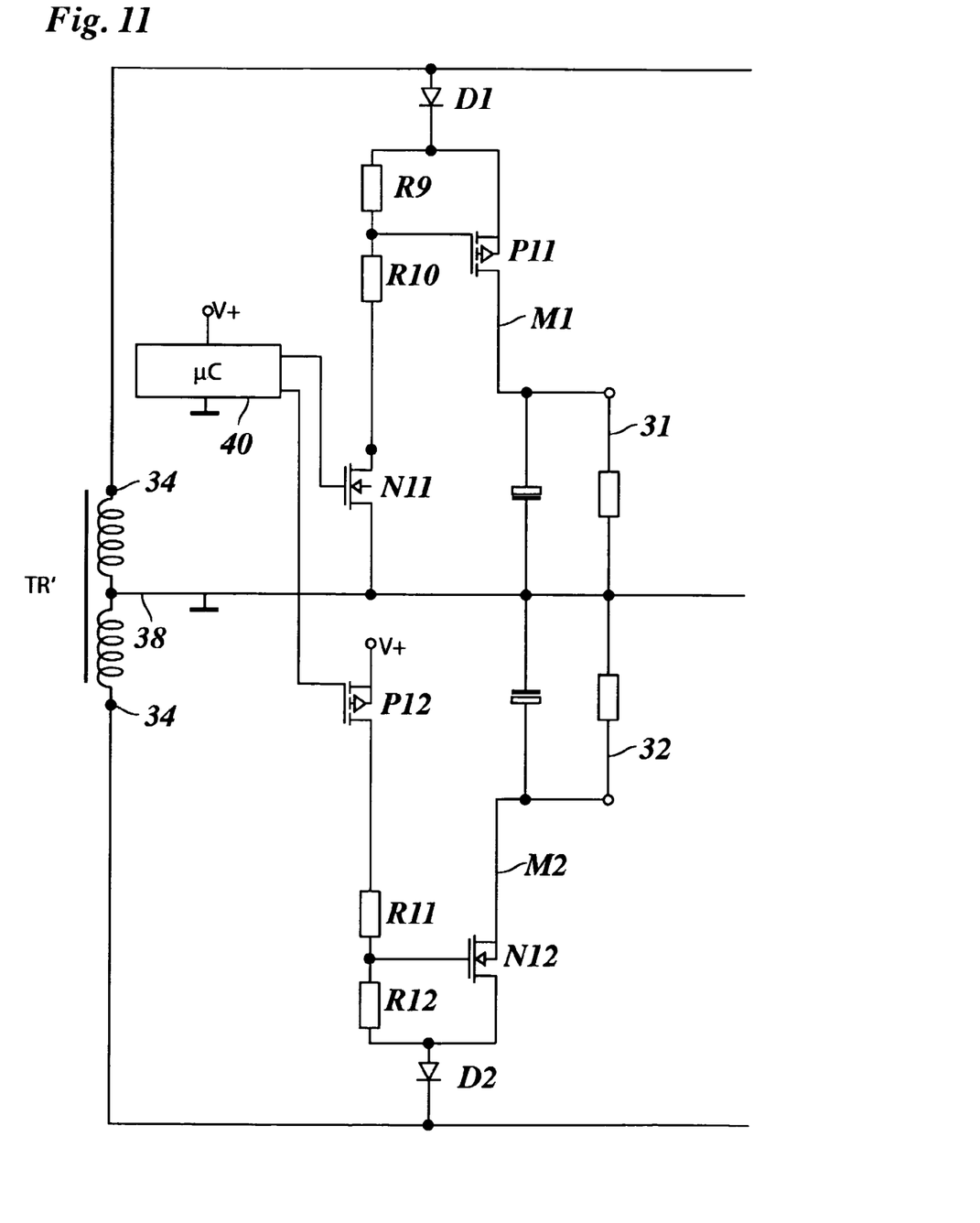

FIG. 11 illustrates an example of a converter wherein some of the output circuits provide a positive output voltage and others provide a negative output voltage relative to a common ground.

In this case, the inductive element is again a transformer TR', which, however, has a central tap in the secondary winding. This central tap forms the second output terminal 38 and serves as a common ground for all the load circuits which, in FIG. 11, have been represented by only two load circuits 31, 32. The load circuit 31 (and several additional load circuits that have not been shown) provide a positive output voltage and are located in a positive branch of the converter, whereas the load circuit 32 (and several other load circuits which have not been shown) provide a negative output voltage and are arranged in a negative branch of the converter.

The multiplexer channel M1 in the positive branch includes a P-channel MOS-FET P11 between the diode D1 and the load circuit 31. The gate is controlled via resistors R9, R10 and an N-channel MOS-FET N11 that is directly controlled by the microcontroller 40. In contrast, the multiplexer channel M2 in the negative branch includes an N-channel MOS-FET N12 between the load circuit 32 and the diode D2. The gate of this MOS-FET is controlled via a P-channel MOS-FET P12 and resistors R11, R12. The gate of the MOS-FET P12 is controlled directly by an output of the microcontroller 40, and the source is connected to a constant positive voltage V+, e.g. the drive voltage for the microcontroller 40, so that the P-channel MOS-FET P12 becomes conductive when a zero voltage is output from the microcontroller.

What is claimed is:

1. A power converter comprising:
    an inductive element,
    a DC input connected to the inductive element,
    a switch arranged to interrupt the inductive current cyclically with a predetermined cycle period,
    a plurality of load circuits, and
    a multiplexer having a plurality of parallel channels between first and second output terminals of the inductive element, and
    wherein:
        each channel includes one of the load circuits,
        the multiplexer is adapted to make the channels conductive sequentially and periodically, and
        the multiplexer has a switching period that is a multiple greater than 1 of the predetermined cycle period of the switch.

2. The power converter according to claim 1, wherein the inductive element is a transformer having the switch on a primary side thereof and the load circuits on a secondary side of the transformer.

3. The power converter according to claim 2, wherein the transformer is isolated.

4. The power converter according to claim 1, further comprising a controller controlling the multiplexer for controlling output power of the load circuits by determining numbers of cycle periods of the switch for which the channels of the multiplexer that are associated with the individual load circuits are conductive in each multiplex period.

5. The power converter according to claim 4, wherein the controller is adapted to control the switch to operate the converter in a discontinuous mode, and to control the multiplexer to switch from one channel to another in time intervals where the inductor current is zero.

6. The power converter according to claim 4, wherein the controller is adapted to control the multiplexer to switch to another channel after each cycle period of the switch.

7. The power converter according to claim 1, further comprising a controller controlling the multiplexer and the switch and adapted to vary a duty cycle of the switch in accordance with the identity of the load circuit for which the multiplexer channel is conductive.

8. The power converter according to claim 4, further comprising an AC/DC converter converting an AC voltage into a DC voltage to be applied to the DC input, and further comprising a synchronization circuit synchronizing the controller with the AC voltage.

9. The power converter according to claim 8, wherein the controller is adapted to vary the duty cycle of the switch so as to compensate for fluctuations of the DC voltage.

10. The power converter according to claim 9, wherein the AC/DC converter is adapted to supply a periodically fluctuating DC voltage to the DC input, and the controller is adapted to vary the duty cycle of the switch periodically.

11. The power converter according to claim 1, further comprising:
control circuitry for controlling the switch and the multiplexer, and
an additional load circuit connected in parallel with the other load circuits but connected directly to a second output terminal of the inductive element and providing an operating voltage for the control circuitry.

12. The power converter according to claim 11, further comprising an oscillator adapted to control the switch during a start-up phase of the converter, until the additional load circuit provides a sufficient operating voltage for the control circuitry.

13. The power converter according to claim 11, wherein at least one of the load circuits that are connected to the multiplexer includes an LED as the load and a capacitor connected in parallel to the LED, and said capacitor is connected to the additional load circuit via a diode, so that the capacitor may discharge and keep the control circuitry operating for a certain time when the voltage at the DC input falls off.

14. The power converter according to claim 11, wherein the control circuitry is adapted to monitor the voltage supplied to the additional load circuit, thereby to detect a condition in which at least one of the load circuits is interrupted.

15. The power converter according to claim 1, wherein one of the load circuits includes, as a load, a fan that is connected to the multiplexer in common with a floating terminal of at least one of the other load circuits, so that the power of the fan is dependent on power consumption of said at least one other output circuit.

* * * * *